Figure 1:
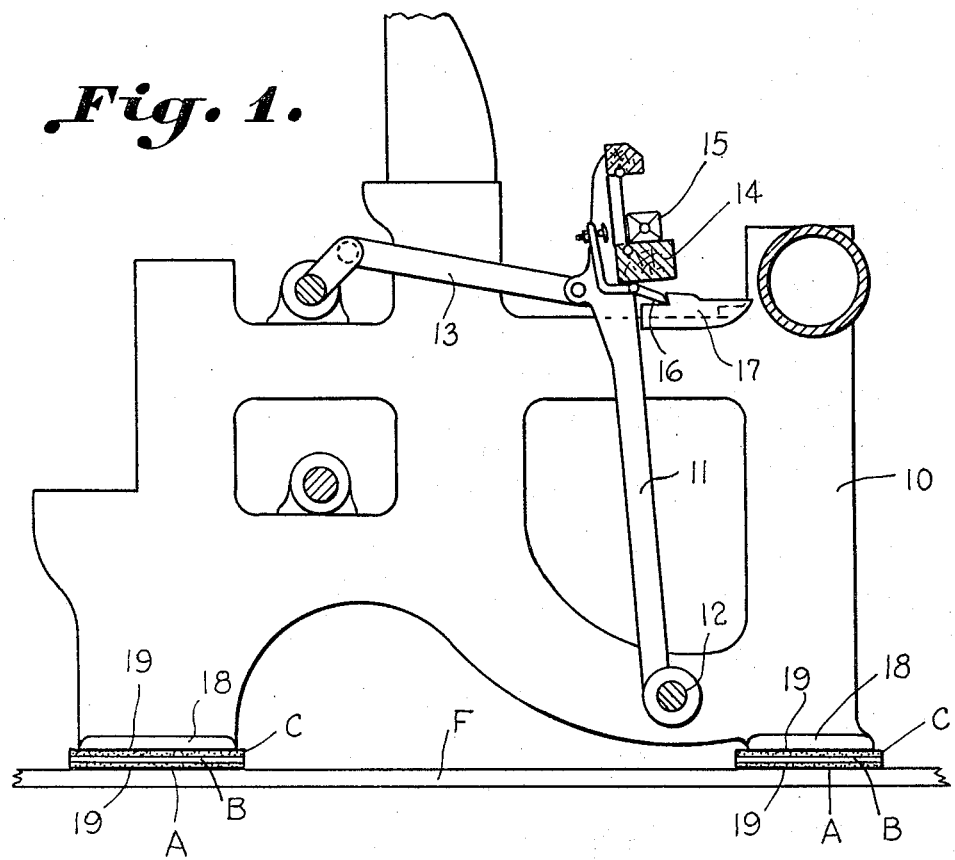

July 25, 1967  L. C. KELLETT  3,332,646

MACHINE PAD

Filed Nov. 19, 1965

INVENTOR.
LOUISE C. KELLETT
BY
ATTORNEY

United States Patent Office 3,332,646
Patented July 25, 1967

3,332,646
MACHINE PAD
Louise C. Kellett, 10 Parkwood Drive,
Greenville, S.C. 29609
Filed Nov. 19, 1965, Ser. No. 508,713
1 Claim. (Cl. 248—22)

This invention pertains to a vibration absorbing member, and relates particularly to a novel construction of a shock absorbing material especially suited for absorbing normal vibrations, as well as violent shocks from heavy machinery.

Heretofore, vibration absorbing pads and the like have been placed under heavy vibrating machinery, such as a loom, to absorb vibration from the machine. In the operation of a loom, for example, it is important that the vibrations be attenuated so as to maintain the loom parts in proper alignment and to prevent such from being damaged. One expedient for attenuating vibrations under a loom contemplates using felt pads. Such has not proven satisfactory due to the fact that the felt, after a period of time, tends to compress and eventually loses its vibration damping characteristic. Another disadvantage with using felt pads is that the felt becomes contaminated with oil, grease, cleansing material, and the like, used on and around the machinery. Such foreign substances cause the pads to deteriorate and lose their vibration absorbing qualities. Still another disadvantage with soft pads, such as those constructed of foam rubber and felt, is that violent concentrated shocks are not diffused over the entire surface area of the pads and as a result such shocks are not properly attenuated.

Other problems encountered in placing vibration pads under looms include walking and rocking of the loom and preserving alignment and levelness as originally installed. In order to avoid the walking problem some of the pads have been bolted to the loom and the floor. Such is generally expensive.

The present novel construction for a vibration absorbing pad minimizes the above problems, and provides a simple and inexpensive structure for absorbing normal vibrations from machines as well as violent shocks.

Accordingly, it is an object of the present invention to provide a shock absorbing pad that will absorb the normal shocks from a machine as well as diffuse violent shocks from the machines.

Another object of the present invention is to provide a a shock absorbing pad that does not compress after an extended period of use.

Still another object of the present invention is to provide a shock absorbing pad that does not become contaminated by grease, oil and other foreign substances used on and around machines.

Another important object of the present invention is to provide a shock absorbing pad that is reusable after being used for an extended period of time under a heavy machine.

A further object of the present invention is to provide a shock absorbing pad that minimizes rocking and walking of a machine under which such is inserted.

Still another important object of the present invention is to provide a suport pad which will minimize wear and damage to machine parts resulting from vibration and sudden shock.

The construction designed to carry out the invention will be hereinafter described, together with other features thereof.

Figure 2:
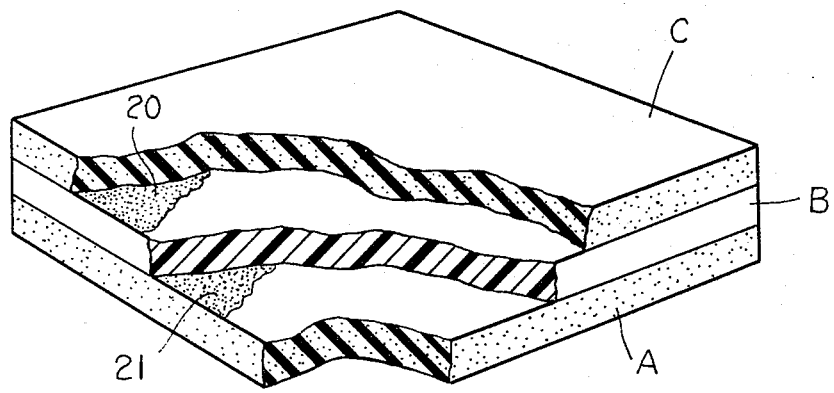

The invention will be more readily understood from a reading of the following specification and by reference to the accompanying drawing forming a part thereof, wherein an example of the invention is shown and wherein:

FIGURE 1 is a schematic transverse sectional elevation illustrating a loom in slam-off position, equipped with pads constructed in accordance with the present invention, and FIGURE 2 is an enlarged perspective view, with parts broken away, illustrating a pad constructed in accordance with the present invention.

The drawing illustrates a vibration absorbing member for insertion under heavy machinery supporting same for absorbing the normal vibration of the machine as well as distributing sudden violent shocks produced by the machine over the surface of the member. A base layer A is constructed of a flexible closed cell rubbery material, preferably neoprene and the like, capable of withstanding vibration from the machine over long periods of time. An intermediate rigid layer B constructed of noncompressible material of substantial thickness so as to avoid flexing, preferably such as nylon and the like, is carried by the base layer in surface contact therewith. An adhesive medium is disposed between the intermediate layer and base layer for bonding same together. An upper layer C also constructed of such flexible closed cell rubbery material capable of withstanding vibration and successive violent shocks from the machine over long periods of time is carried by the intermediate layer in surface contact therewith. An adhesivve medium is disposed between the intermediate layer and the upper layer for bonding same together. The rigid intermediate layer is capable of distributing vibrations and violent shocks over the surface of the base layer, thus minimizing the concentration of shocks. Thus, damage and excessive wear of machine parts may be avoided. While the device is illustrated and is especially useful with looms, any heavy machinery is benefited thereby.

FIGURE 1 illustrates a loom with parts in slam-off position as explained in greater detail below. When a slam-off occurs a violent shock is imposed upon the associated loom parts. The loom includes a side 10 and a lay sword 11 illustrated as being carried by a rocker shaft 12 and connected to suitable lay drive mechanism 13. The lay 14, carried on one end by the lay sword 11, supports a shuttle 15 which moves back and forth and across during weaving. If for any reason the shuttle does not carry out its flight across the lay in proper sequnnce, protection mechanism is actuated to stop the lay in order to prevent damage to the warp (not shown). The protection mechanism includes a dagger 16 carried adjacent each end of the loom, moving with the lay. Upon actuation of the protection mechanism the dagger 16 is raised to the position shown in FIGURE 1 to engage its associated frog 17. A frog 17 is carried by each of the respective loom sides.

It is desirable to cushion the shock occasioned by the daggers engaging the frogs on a slam-off. The force exerted by the daggers sometimes results in the breaking of the loom sides or other associated loom parts. Such force far exceeds the normal forces tending to produce vibration during normal loom operation because the entire force of the loom drive, together with the inertia of the loom swords and the lay are exerted on the beat up stroke, and such is abruptly mechanically halted by the engagement of the daggers described above.

The loom includes base portions 18 under which pads constructed in accordance with the present invention are placed. The pads in turn are supported by the floor of the mill F. Preferably, a suitable adhesive medium, such as a synthetic rubber solvent cement 19, may be placed between the base 18 and the upper-surface of the pad and between the floor F and the undersurface of the pad. It has been found that it is unnecessary to bolt the pads to the floor and to the base portions of the loom as the tendency of the loom to vibrate excessively, consequently to walk or move about, is avoided through use of the subject pads.

The pads include a base layer A constructed of flexible closed cell rubbery material. Such material is preferably neoprene and must be capable of withstanding vibration from the machine over long or extended periods of time during which the machine is in operation. Such a neoprene material is described in U.S. Letters Patent No. 2,873,481 and a closed cellular material having the following composition in parts by weight has been found suitable:

| | |
|---|---|
| Neoprene | 100 |
| Calcium silicate | 55 |
| Zinc oxide | 4 |
| Magnesium oxide | 5 |
| Antioxidant | 1 |
| Nitrogen flowing agents | 8 |

An intermediate rigid layer B is constructed of noncompressible material of substantial thickness so as to avoid flexing. Such material is preferably nylon or a similar synthetic polymeric material and the like, and such is carried by the base layer B in surface contact therewith. It is preferable that the intermediate layer B be of a thickness on the order of the thickness of the layer A as best illustrated in FIGURE 2. It is important that the intermediate layer be sufficiently rigid and sufficiently inflexible as to transmit vibrations and forces resulting from shock to the base layer across its surface, thus damping the effect of the vibration and shock. An adhesive medium 20 is disposed between the intermediate layer B and the base layer for bonding the two together. This adhesive may also take the form of a synthetic rubber solvent cement. An upper layer C also constructed of such flexible closed cell rubbery material is carried by the intermediate layer in surface contact therewith. A similar suitable adhesive medium 21 is disposed between the intermediate layer B and the upper layer C for bonding same together.

It has been found that wear is occasioned by vibrations and shocks produced by machines, such as looms, during the operation. Such wear is especially pronounced in the moving parts of the machine and often even breakage of the parts themselves results. By distributing the vibrations and violent shocks over the surface of the pads vibration and shocks are dampened and minimized. In the case of a slam-off as illustrated above, the base layer A and the upper layer C permit a substantial yielding of the pad to cushion the shock and yet during normal loom operation the vibrations are dampened by the intermediate inflexible layer B so as to avoid walking and the like.

While a preferred embodiment of the invention has been described using specific terms, such description is for illustrative purposes only, and it is to be understood that changes and variations may be made without departing from the spirit or scope of the following claim.

What is claimed is:

A vibration absorbing member for insertion under heavy machinery supporting same for absorbing the normal vibration of the machine as well as distributing sudden violent shocks produced by the machine over the surface of the member including, a base layer constructed of a flexible closed cell rubbery material capable of withstanding vibration and successive violent shocks from the machine over long periods of time, said base layer being essentially neoprene, an intermidate rigid layer constructed of noncompressible synthetic polymeric material of substantial thickness so as to avoid flexing carried by and in surface contact with said base layer, means between said intermediate layer and said base layer for bonding same together, an upper layer constructed of a flexible closed cell rubbery material capable of withstanding vibration and successive violent shocks from the machine over long periods of time carried by and in surface contact with said intermediate layer, said upper layer being essentially neoprene, means between said intermediate layer and said upper layer for bonding same together, said rigid intermediate layer being capable of distributing vibrations and violent shocks over the surface of said base layer thus diffusing and dumping shocks, whereby damage to the machine and excessive wear of its parts resulting from the normal vibrations and sudden shocks produced during machine operation are avoided.

References Cited

UNITED STATES PATENTS

| | | | |
|---|---|---|---|
| 1,766,471 | 6/1930 | Van Dusen | 161—115 |
| 1,791,856 | 2/1931 | Van Dusen | 161—94 |
| 1,917,929 | 7/1933 | Duffy | 248—9 X |
| 2,724,670 | 11/1955 | Mason | 248—22 X |
| 3,160,549 | 12/1964 | Caldwell et al. | 161—161 |

ROY D. FRAZIER, *Primary Examiner.*

F. DOMOTOR, *Assistant Examiner.*